United States Patent [19]

Purton et al.

[11] 4,004,613
[45] Jan. 25, 1977

[54] FLOW CONTROL VALVE

[75] Inventors: Robert Merrill Purton; Robert Brent Maddock, both of Cerritos, Calif.

[73] Assignee: Dresser Industries, Inc., Dallas, Tex.

[22] Filed: Sept. 9, 1975

[21] Appl. No.: 611,761

[52] U.S. Cl. .................... 137/625.3; 137/625.37; 138/42

[51] Int. Cl.² ........................................ F16K 47/00

[58] Field of Search ............... 137/625.3, 625.37; 251/127; 138/42

[56] References Cited

UNITED STATES PATENTS

| 3,219,059 | 11/1965 | Williams et al. | 137/625.37 X |
| 3,513,864 | 5/1970 | Self | 137/625.3 X |
| 3,880,399 | 4/1975 | Luthe | 137/625.37 X |
| 3,894,716 | 7/1975 | Barb | 137/625.3 X |
| 3,917,221 | 11/1975 | Kubota et al. | 137/625.37 X |

FOREIGN PATENTS OR APPLICATIONS

| 1,371,350 | 7/1964 | France | 138/42 |
| 1,008,977 | 5/1957 | Germany | 137/625.3 |

*Primary Examiner*—Arnold Rosenthal
*Attorney, Agent, or Firm*—Roy L. Van Winkle; John N. Hazelwood

[57] ABSTRACT

The valve described herein, includes a hollow valve body having inlet and outlet passageways extending into the body and a valve member positioned in the body for movement between open and closed positions. A plurality of orifice members are disposed between the inlet and the outlet so that fluid flowing through the valve must pass therethrough. The orifice members are arranged so that fluid flow from inlet to the outlet must follow a tortuous path through a series of orifices. The orifices are sized to restrict fluid flow and thus reduce the pressure as the fluid flows through the valve. Also, the relatively long tortuous flow path is provided so that the pressure is reduced over a considerable distance with as little noise as possible. The orifice members are arranged so that the inlet to each series of members is through an annular space that is narrower than the smallest of the orifices so that any particle passing through the annular space will pass through the valve.

6 Claims, 3 Drawing Figures

FLOW CONTROL VALVE

BACKGROUND OF THE INVENTION

This invention relates generally to improvements in fluid control vavles. More particularly, but not by way of limitation, this invention relates to an improved, quiet, fluid pressure control valve. In control valves of the type described in detail hereinafter, it is desirable to reduce the pressure fluid flowing therethrough from a very high pressure to some lesser pressure and to dissipate the energy thus released in such a manner that liquids will not be vaporized nor will extremely high velocities be developed that will result in either erosion of the valve or downstream apparatus or that will result in unacceptable high noise levels as the pressure is reduced. Some examples of designs which have been proposed to accomplish the foregoing are illustrated by U.S. Pat. Nos. 3,513,864, issued May 26, 1972 to R. E. Self; 3,514,074, issued May 26, 1972 to R. E. Self; 3,529,628, issued Sept. 22, 1972 to S. A. Cummins; and, 3,690,344, issued Sept. 12, 1972, to Richard S Brumm.

Each of the foregoing describes a valve that has been designed for the purpose of reducing the pressure of fluid flowing therethrough. Each of foregoing is provided with a plurality of stacked, annular members disposed between the inlet and outlet of the valve and through which fluid must flow. Each, with the exception of U.S. Pat. No. 3,680,344, has arranged the stacked annular members in such a manner that fluid flowing through the valve must follow a very tortuous path through a plurality of orifice like openings as it passes through the valve to dissipate the energy that is released as the pressure is reduced.

In the 3,690,344 patent, a plurality of stacked plates are provided, but the flowpath therethrough is generally in a straight line, The energy is dissipated due to the restriction provided by the narrow spaces between the stacked plates.

Again, wih the exception of the 3,690,344 patent, it will be appreciated that the annular members that are utilized to form the flowpath through the valves are of extremely complex configuration and are of such construction that the orifices can become plugged. Also, the complexity of the designs result in considerable difficulty in the manufacturing and construction of the annular members and valves.

One object of this invention is to provide an improved flow control valve that includes orifice members that may be readily and easily constructed by normal manufacturing methods and that may be easily maintained during service.

Another object to this invention is to provide an improved flow control valve having orifice plates providing a relatively long, tortuous flowpath for dissipation of the energy and at the same time preventing flow therethrough of any particles that would be of sufficient size to block the flow path.

A further object of this invention is to provide an improved flow control valve wherein the orifice plates can be quickly and easily removed and cleaned in the event they should become plugged or flow therethrough unduly restricted.

SUMMARY OF THE INVENTION

This invention provides an improved, quiet, control valve comprising: a hollow valve body having inlet and outlet passageways extending into the body and an annular valve seat encircling the outlet passageway; a valve member movably positioned in the body that is engageable with the valve seat to close the valve; means on the body for moving the valve member; and flow control means in the body between the inlet and outlet passageways that includes annular means having a tortuous flow path therethrough and having an annular space therein forming the inlet to flow path. The annular space being dimensionally more narrow than any other portion of the flow path thus preventing flow therethrough of any particle sufficient in size to block the flow path.

The foregoing and additional objects and advantages of the invention will be more fully understood when the following detailed description is read in conjunction with the accompanying drawing.

DETAILED DESCRIPTION OF THE PREFERRED EMBODIMENT

Figure 1:
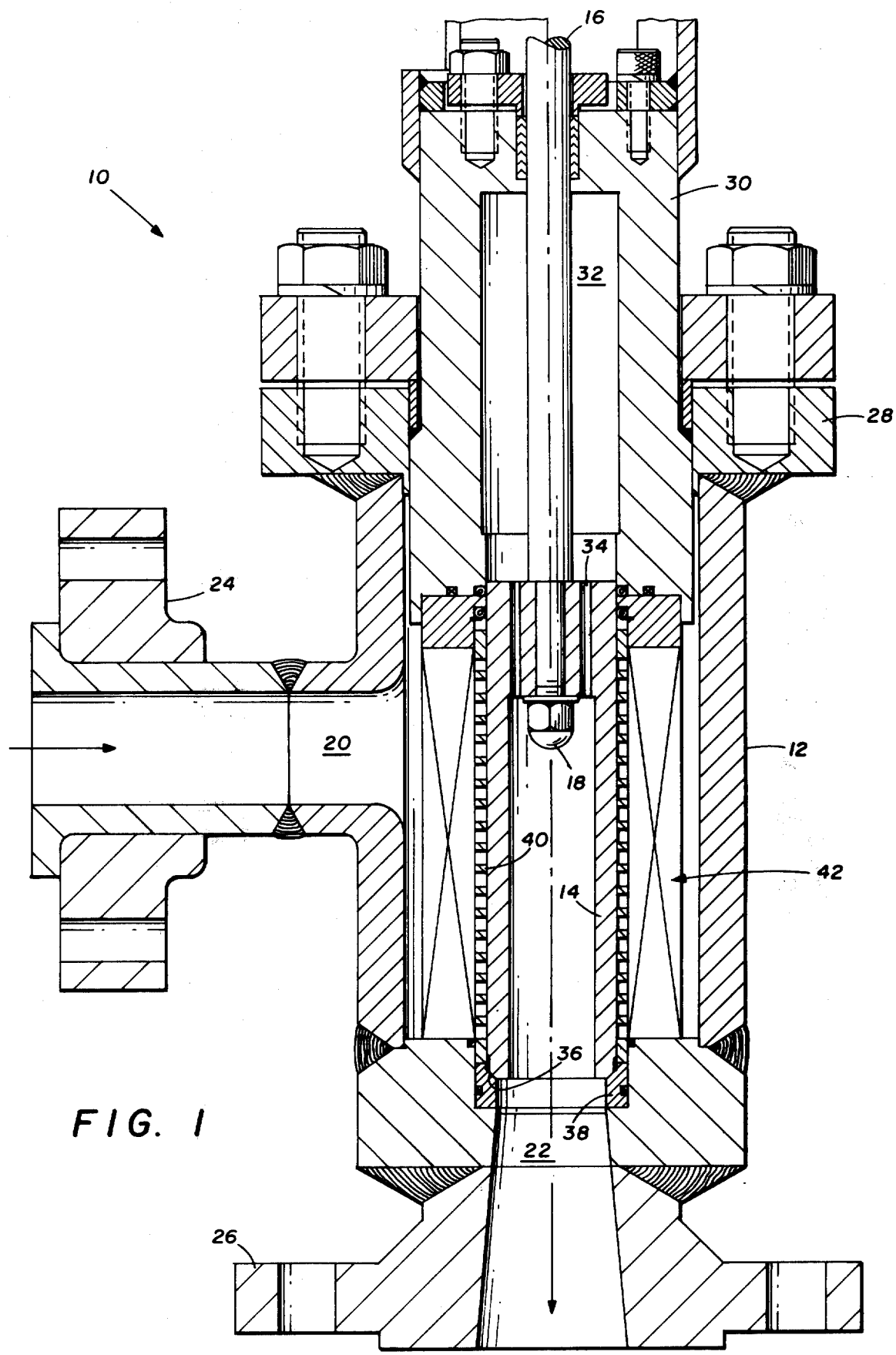
FIG. 1 is a cross-sectional view of an improved flow control valve that is constructed in accordance with the invention.

Referring to the drawing, shown therein and generally designated by the reference character 10, is an improved flow control valve constructed in accordance with the invention. The valve 10 includes a valve body 12 that is generally T-shaped in configuration, an elongated valve member 14 movably positioned within the hollow body 12, and valve operating means 16 that extends into the valve body 12 and is connected to the valve member 14 by the threaded fastener 18.

The valve body 12 is provided with an inlet passageway 20 extending into one side of the valve body 12 and an outlet passageway 22 that extends through one end of the valve body 12. An inlet flange 24 is connected with the valve body 12 in fluid communication with the inlet passageway 20 and an outlet flange 26 is connected with the valve body 12 in fluid communication with the outlet passageway 22. While the flanges 24 and 26 are illustrated, it will be apparent that any suitable means of providing for the connection of external piping (not shown) to the valve 10, may be utilized as desired.

As illustrated in FIG. 1, a flange connection 28 is provided to attach a cap 30 to the valve body 12. The cap 30 may be connected to the valve body 12 in any suitable manner, but it is provided with a cavity 32 that is sized to accommodate the valve member 14 during its travel within the valve body 12. The cap 30 also accommodates the valve operating means 16 as well as controls (not illustrated) for moving the valve member 16.

The valve member 14 is provided with a plurality of passageways 34 that permit fluid communication from the outlet passageway 22 into the cavity 32 in the cap 30 so that the valve member 14 is substantially balanced with respect to any pressure forces thereon. The valve member 14 is also provided with a beveled sealing surface 36 on one end thereof that is arranged to sealingly engage a complementary annular valve seat 38 that is located in the housing 12. While illustrated as being a separate member, the annular valve seat 38 may be constructed as an integral portion of the housing 12 if desired.

Encircling the valve member 14 is a perforated sleeve 40. Encircling the sleeve 40 is a flow control assembly that is designated by the reference character 42 and which may be seen in more detail in FIGS. 2 and 3. The flow control assembly 42 is disposed between the inlet and outlet passageways 20 and 22 in such a position that fluid flowing through the valve 10 must pass therethrough. The flow path through the flow control assembly 42 may be described as tortuous and is arranged to provide a reduction in the pressure of fluid flowing through the valve 10.

Figure 2:
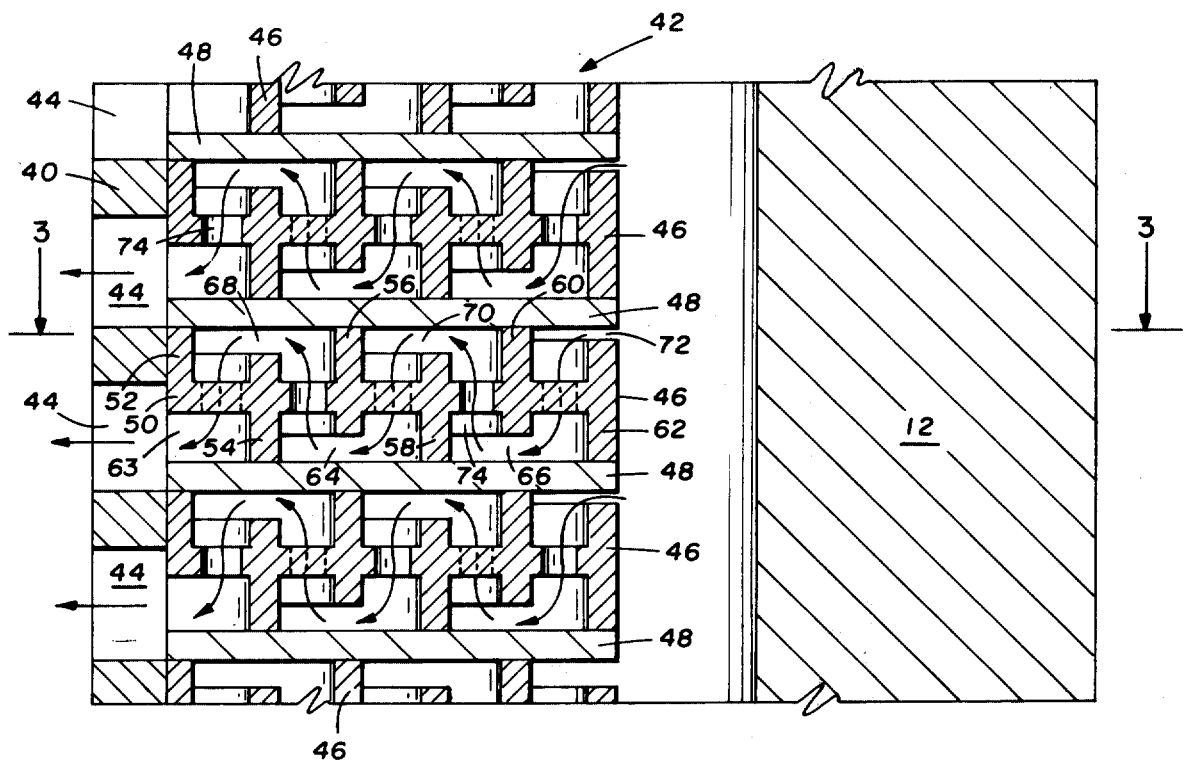
FIG. 2 is an enlarged, partial cross-sectional view illustrating the structure and arrangement of the orifice members utilized in the flow control valve of FIG. 1.
Figure 3:
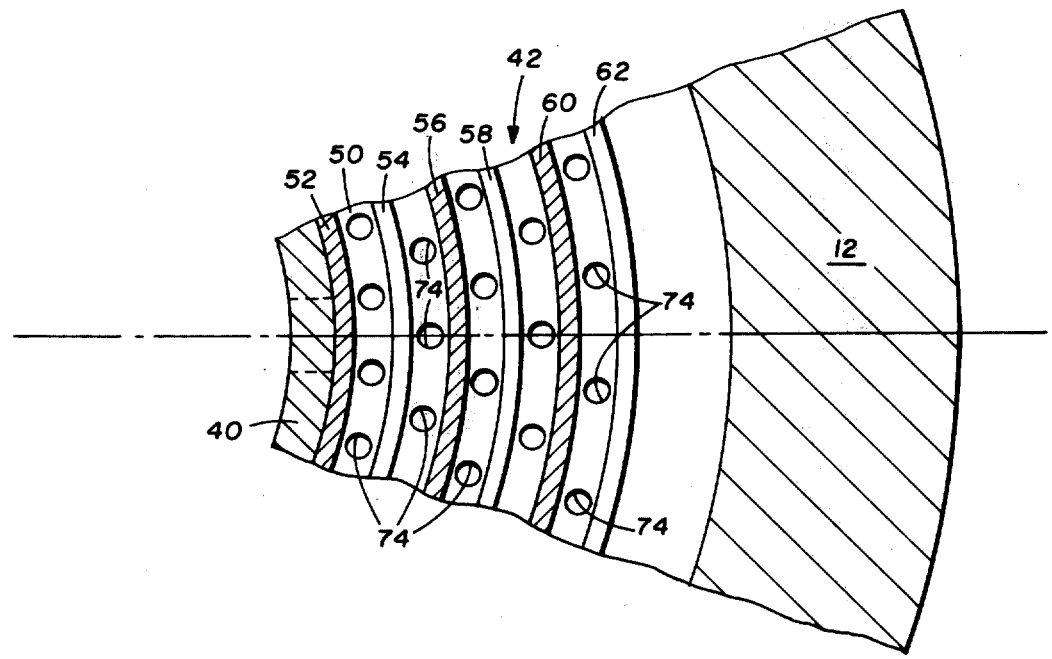
FIG. 3 is a partial cross-sectional view taken generally along he line 3—3 of FIG. 2.

As shown most clearly in FIG. 2, the sleeve 40 includes a plurality of perforations 44 that extend through the sleeve 40. To provide the tortuous flow path through the flow control assembly 42, a plurality of annular orifice members 46 and annular disks 48 are located in alternate arrangement along the exterior of the sleeve 40. Preferably, the annular orifice members 46 are identical in construction to provide for ease in manufacture and are designed to be produced by standard machine shop equipment. Each of the orifice members 46 includes a central web portion 50 from which alternately directed and radially spaced annular lands 52, 54, 56, 58, 60 and 62 project. It will be noted that alternate lands, that is annular lands 52, 56 and 60 extend relatively upwardly from the web portion 50 into engagement with one of the disks 48 located relatively above the orifice member 46. Similarly, alternate lands 54, 58 and 62 extend downwardly from the web portion 50 into engagement with another of the disks 48 that is located relatively below the orifice member 46.

While the lands 52, 56 and 60 do extend downwardly, they are shortened and do not engage the disk member 48, but define annular spaces or orifices 63, 64 and 66 which form a portion of the flow path through the valve 10. Similarly, annular lands 54, 58 and 62 extend upwardly toward the disk member 48 located above the orifice member 46. However, they do not engage the disk 48, but define annular spaces or orifices 68, 70 and 72 therewith.

In the web 50, and between the concentric annular lands, flow restricting orifices 74 are provided so that the flow through the flow control assembly 42 is substantially as illustrated by the arrows in FIG. 2. Since the orifices 74 are located in annular grooves defined by the lands, it is not necessary that the orifice members 46 be aligned in any particular manner since each orifice member 46 defines its own flow path through the valve 10.

It should be pointed out that the annular orifice 72, which is located between the outermost land 62 and the adjacent disk 48, is narrower than any of the other orifices described. Accordingly, the orifice 72 determines the size of particle that can enter the flow path through the valve 10. By constructing the orifice 72 narrower than any other orifice in the valve 10, no particle can pass into the flow path that will plug any of the other orifices. Furthermore, since the orifice 72 is annular in configuration, any particle will block only a minute portion of the orifice 72 and, due to the large total flow area of the orifice 72, will not severely restrict or plug the flow passageway through the particular orifice member 46 involved.

The number of orifice members 46 used, will depend on the capacity of the valve 10. A sufficient number of the orifice members 46 should be provided so that the flow area will be greater than the anticipated capacity so that the energy dissipated as the pressure drop occurs across the orifice members 46, will be dissipated over a relatively larger area thereby reducing the noise generated. Also, the number of concentric annular lands provided on each orifice plate 46 can vary depending on the length of flow path desired to dissipate the energy. Again, the longer the flow path, the slower the pressure reduction and consequently the quieter the valve will be in operation.

With regard to manufacture of the valve, and particularly with respect to the orifice plates 46, it should be pointed out that such members can be quickly and easily produced by such simple machines as a lathe and drill press. Manifestly, the orifice members 46, due to their simple configuration, could be cast and then drilled or cast with the orifices 74 formed during the casting operation if desired.

The orifice plates 46 and the disks 48 are preferably located on the sleeve 40 with a slight interference fit so that they can be removed from the valve body 12 as a unit for cleaning or replacement. Once removed, the particles, which will have collected at the circular orifices 72, can be quickly and easily removed with a scraper inserted in the orifices 72. It will be appreciated that removal of the cap 30 provides complete access to the flow control assembly 42.

In the operation of valve 10, exterior piping (not shown) is connected to the inlet passageway 20 and the outlet passageway 22, and the valve member 14 is moved to a position off the valve seat 38, so that fluid flows through the valve 10 in the direction of the arrows as illustrated in FIG. 1. As the fluid enters the valve body 12, it passes first through the annular orifice 72 where any particles that might plug the valve 10 are screened out and then through the first row of orifices 74, through the annular orifices 66, the second row of orifices 74 and through the annular orifice 70 through the third row of orifices 74, through the annular orifice 64 through the fourth row of orifices 74, past the annular orifice 68, and then through the innermost row of orifices 74 and outwardly of the flow control assembly 42 through the annular orifices 63 that are in fluid communication with the perforations 44 in the sleeve 40. After flowing through the sleeve 40, the fluid enters the outlet passageway 22 for discharge from the valve.

The position of the valve member 14 during operation of the valve 10 is determined by the volume of fluid passing through the valve 10. For example, if the valve 10 is receiving fluid at substantially design capacity, the valve member 14 is moved into the cavity 32 clearing all of the perforations 40 in the sleeve 14. If lesser quantities of fluid are flowing through the valve 10, the valve member 14 can be positioned as desired. However, it will be noted that the more flow area provided, that is the more perforations 40 that are open to fluid flow, the more the area that is provided for dissipation of the energy of the fluid flowing into the valve 10.

From the foregoing, it will be appreciated that the valve 10 as described hereinbefore, provides means for controlling the dissipation of energy of fluid flowing therethrough in a quiet and efficient manner. Also, the valve as described includes the flow control assembly 42 that can be quickly and easily manufactured and maintained in a relatively inexpensive manner.

Having described but a single embodiment of the invention, it will also be understood that many changes and modifications can be made thereto without departing from the spirit and scope of the invention.

The embodiments of an invention in which an exclusive property or privilege is claimed are defined as follows:

1. An improved, quiet, control valve comprising:
   a hollow valve body having inlet and outlet passageways extending into said body, and having an annular valve seat encircling said outlet passageway;
   a valve member movably positioned in said body and engageable with said valve seat to close said valve;
   means on said body for moving said valve member; and,
   flow control means in said body between said inlet and outlet passageways including annular means having a tortuous flow path therethrough and having an annular space therein forming the inlet to said flow path, said annular space being dimensionally narrower than any other portion of said flow path preventing flow therethrough of any particle sufficient in size to block said flow path, said annular means including means defining spaced, first and second radially disposed surfaces and also including an annular orifice member between said surfaces having radially spaced annular lands, successive lands engaging one only of said first and second surfaces, said orifice member having a plurality of orifices extending therethrough between said lands.

2. An improved, quiet, control valve comprising:
   a hollow valve body having inlet and outlet passageways extending into said body, and having an annular valve seat encircling said outlet passageway;
   a valve member movably positioned in said body and engageable with said valve seat to close said valve;
   means on said body for moving said valve member;
   flow control means in said body between said inlet and outlet passageways including annular means having a tortuous flow path therethrough and having an annular space therein forming the inlet to said flow path, said annular space being dimensionally narrower than any other portion of said flow path preventing flow therethrough of any particle sufficient in size to block said flow path; and,
   said annular means includes spaced first and second annular disks encircling said valve member and a generally annular orifice member located between said disks and also encircling said valve member, said orifice member having radially-spaced first and second, annular lands, each of said first and second lands engaging a respective one of said first and second disks and spaced from the other said disk, a plurality of orifices extending through said orifice member between said lands, said orifices and lands forming said tortuous flow path therethrough, said annular space being located between said second land and said first disk, said annular space being in fluid communication with said inlet passageway.

3. The control valve of claim 2 and also including a perforated sleeve member disposed in said body encircling said valve member, said sleeve member closely receiving said valve member and located between said valve member and annular orifice member, whereby movement of said valve member to uncover the perforations in said sleeve member permits fluid communication from said inlet passageway to said outlet passageway.

4. The control valve of claim 3 and also including:
   a plurality of said annular orifice members;
   a plurality of said annular disks spacing said orifice member along said sleeve member; and,
   said sleeve member having a plurality of perforations located adjacent each said orifice member.

5. The control valve of claim 4 wherein said valve member has at least one passageway extending therethrough permitting the pressure in said outlet passageway to be imposed on both ends of said valve member whereby said valve member is substantially pressure-balanced.

6. The control valve of claim 2 wherein each said orifice member includes more than two radially-spaced, annular lands providing additional changes in direction in fluid flow and is provided with additional orifices to further reduce the pressure of fluid flowing through said valve.

* * * * *